United States Patent
Uchizawa

(10) Patent No.: US 12,214,628 B2
(45) Date of Patent: Feb. 4, 2025

(54) PNEUMATIC TIRE

(71) Applicant: The Yokohama Rubber Co., LTD., Tokyo (JP)

(72) Inventor: Saiko Uchizawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 491 days.

(21) Appl. No.: 17/595,683

(22) PCT Filed: May 27, 2020

(86) PCT No.: PCT/JP2020/021013
§ 371 (c)(1),
(2) Date: Nov. 22, 2021

(87) PCT Pub. No.: WO2020/241719
PCT Pub. Date: Dec. 3, 2020

(65) Prior Publication Data
US 2022/0219497 A1    Jul. 14, 2022

(30) Foreign Application Priority Data
May 27, 2019   (JP) .................................. 2019-098894

(51) Int. Cl.
*B60C 17/00* (2006.01)
*B60C 15/06* (2006.01)

(52) U.S. Cl.
CPC ...... *B60C 15/0603* (2013.01); *B60C 15/0607* (2013.01); *B60C 17/0009* (2013.01);
(Continued)

(58) Field of Classification Search
CPC ........................................ B60C 17/00–17/009
See application file for complete search history.

(56) References Cited

U.S. PATENT DOCUMENTS

2015/0202929 A1   7/2015  Horiuchi
2020/0016942 A1*  1/2020  Kameda .............. B60C 17/0009

FOREIGN PATENT DOCUMENTS

DE   11 2013 002 460 T5   2/2015
EP         3 059 102 A1    8/2016
(Continued)

OTHER PUBLICATIONS

Extended European Search Report for PCT/JP2020021013, dated Dec. 21, 2022, 10 pages.

*Primary Examiner* — Adrienne C. Johnstone
(74) *Attorney, Agent, or Firm* — Thorpe North & Western

(57) ABSTRACT

A pneumatic tire includes a run-flat reinforcing layer disposed on an inner side in a width direction of a carcass layer, and a second filler disposed between a turned back portion of the carcass layer and a rim cushion rubber. Additionally, a point on a tire outer circumferential surface is defined, the point is located at a position corresponding to 150% of a rim flange height from a measurement point of a rim diameter of a specified rim, a perpendicular line is defined, and the perpendicular line is drawn from the point to a tire inner circumferential surface. A rubber gauge (G1) of the run-flat reinforcing layer on the perpendicular line, and a rubber gauge (G2) of a region from the turned back portion of the carcass layer to a tire outer surface have the relationship $0 < G1/G2 \leq 0.65$.

14 Claims, 4 Drawing Sheets

(52) U.S. Cl.
 CPC ............... *B60C 2015/061* (2013.01); *B60C 2015/0621* (2013.01); *B60C 2017/0072* (2013.01)

(56) References Cited

FOREIGN PATENT DOCUMENTS

| | | |
|---|---|---|
| JP | 2007-210363 A | 8/2007 |
| JP | 2010-137852 A | 6/2010 |
| JP | 2012-96656 A | 5/2012 |
| JP | 2015-98198 A | 5/2015 |
| JP | 5835171 B2 | 12/2015 |
| JP | 2017-56815 A | 3/2017 |
| JP | 2018-130977 A | 8/2018 |
| JP | 2018-154159 A | 10/2018 |
| WO | 2018/116646 A1 | 6/2018 |
| WO | 2019/070084 A1 | 4/2019 |

\* cited by examiner

|  | Conventional Example | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|---|---|---|---|---|
| G1/G2 | 0.76 | 0.65 | 0.20 | 0.25 | 0.30 | 0.25 | 0.25 | 0.25 | 0.25 | 0.25 | 0.25 | 0.25 | 0.25 | 0.25 | 0.25 | 0.25 | 0.25 |
| G3/G2 | 0.96 | 0.96 | 0.96 | 0.96 | 0.96 | 0.50 | 0.60 | 0.70 | 0.80 | 0.60 | 0.60 | 0.60 | 0.60 | 0.60 | 0.60 | 0.60 | 0.60 |
| G2/Gr | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 | 1.00 |
| G3/Gr | 0.96 | 0.96 | 0.96 | 0.96 | 0.96 | 0.50 | 0.60 | 0.70 | 0.80 | 0.60 | 0.60 | 0.60 | 0.60 | 0.60 | 0.60 | 0.60 | 0.60 |
| G3/G1 | 1.26 | 1.48 | 4.80 | 3.84 | 3.20 | 2.00 | 2.40 | 2.80 | 3.20 | 2.40 | 2.40 | 2.40 | 2.40 | 2.40 | 2.40 | 2.40 | 2.40 |
| H1/SH | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 |
| H2/SH | 0.36 | 0.36 | 0.36 | 0.36 | 0.36 | 0.36 | 0.36 | 0.36 | 0.36 | 0.20 | 0.25 | 0.25 | 0.25 | 0.25 | 0.25 | 0.25 | 0.25 |
| H3/SH | 0.54 | 0.54 | 0.54 | 0.54 | 0.54 | 0.54 | 0.54 | 0.54 | 0.54 | 0.54 | 0.54 | 0.50 | 0.55 | 0.55 | 0.55 | 0.55 | 0.55 |
| (H3 - H2)/SH | 0.19 | 0.19 | 0.19 | 0.19 | 0.19 | 0.19 | 0.19 | 0.19 | 0.19 | 0.34 | 0.29 | 0.25 | 0.30 | 0.30 | 0.30 | 0.30 | 0.30 |
| D1/SH | 0.13 | 0.13 | 0.13 | 0.13 | 0.13 | 0.13 | 0.13 | 0.13 | 0.13 | 0.13 | 0.13 | 0.13 | 0.13 | 0.13 | 0.09 | 0.09 | 0.09 |
| D2/SH | 0.09 | 0.09 | 0.09 | 0.09 | 0.09 | 0.09 | 0.09 | 0.09 | 0.09 | 0.09 | 0.09 | 0.09 | 0.09 | 0.09 | 0.13 | 0.13 | 0.13 |
| D3/SH | 0.23 | 0.23 | 0.23 | 0.23 | 0.23 | 0.23 | 0.23 | 0.23 | 0.23 | 0.23 | 0.23 | 0.23 | 0.23 | 0.23 | 0.23 | 0.30 | 0.40 |
| Run-flat durability performance | 100 | 98 | 100 | 100 | 100 | 105 | 110 | 107 | 100 | 105 | 115 | 116 | 116 | 116 | 116 | 119 | 119 |
| Performance on ice | 100 | 102 | 104 | 106 | 104 | 110 | 113 | 113 | 109 | 106 | 115 | 115 | 115 | 117 | 117 | 116 | 116 |

FIG. 4

PNEUMATIC TIRE

TECHNICAL FIELD

The technology relates to a pneumatic tire and particularly relates to a pneumatic tire that can provide improved performance on ice during run-flat running.

BACKGROUND ART

A run-flat tire generally includes a run-flat reinforcing layer provided on an inner side in a width direction of a carcass layer and having a crescent cross-section, and accordingly, run-flat running in a state of a reduced tire internal pressure is realized. The technology described in Japan Patent No. 5835171 is a known conventional pneumatic tire that employs such a structure.

SUMMARY

In a studless tire, there is a demand for providing improved performance on ice even during run-flat running.

The technology provides a pneumatic tire that can provide improved performance on ice during run-flat running.

A pneumatic tire according to an embodiment of the technology includes a bead core, a bead filler disposed on an outer side in a radial direction of the bead core, a carcass layer wrapping the bead core and the bead filler and being wound and turned back, a sidewall rubber constituting a sidewall portion, a rim cushion rubber constituting a rim fitting surface of a bead portion, a run-flat reinforcing layer disposed on an inner side in a width direction of the carcass layer, and a second filler disposed between a turned back portion of the carcass layer and the rim cushion rubber, and the pneumatic tire is characterized in that a point P on a tire outer circumferential surface is defined, the point P is located at a position corresponding to 150% of a rim flange height from a measurement point of a rim diameter of a specified rim, a perpendicular line L is defined, the perpendicular line L is drawn from the point P to a tire inner circumferential surface, and a rubber gauge G1 of the run-flat reinforcing layer on the perpendicular line L, and a rubber gauge G2 of a region from the turned back portion of the carcass layer to a tire outer surface have the relationship $0 < G1/G2 \leq 0.65$.

In a pneumatic tire according to an embodiment of the technology, a rubber gauge G1 of a run-flat reinforcing layer in the region described above where damage to a bead portion is easily generated during run-flat running is set to be small, and thus, the rigidity of a tire side portion in the region described above is reduced. Accordingly, this is advantageous in that the tire ground contact area during run-flat running is ensured, and the performance on ice of the tire is ensured.

BRIEF DESCRIPTION OF DRAWINGS

FIG. 4 is a table showing the results of performance tests of pneumatic tires according to embodiments of the technology.

DETAILED DESCRIPTION

Embodiments of the technology will be described in detail below with reference to the drawings. Note that an embodiment of the technology is not limited to these embodiments. Additionally, constituents of the embodiments include elements that are substitutable and are obviously substitutable while maintaining consistency with the embodiments of the technology. Additionally, a plurality of modified examples described in the embodiments can be combined in a discretionary manner within the scope of obviousness to one skilled in the art.

Pneumatic Tire

Figure 1:
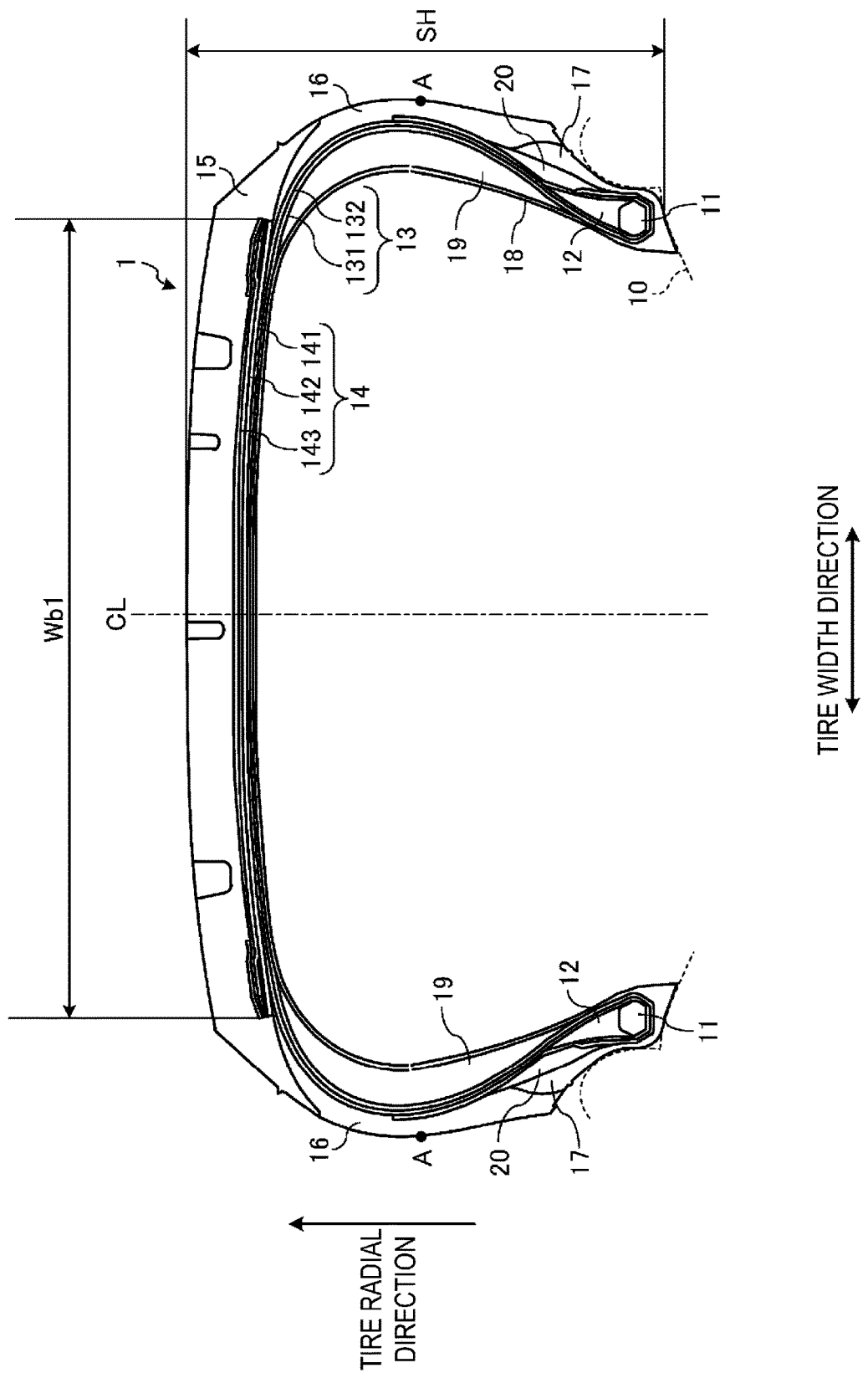
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. Additionally, the same drawing illustrates a run-flat tire that can perform run-flat running at the time of a reduced tire internal pressure.

In the same drawing, cross-section in tire meridian direction is defined as a cross-section of the tire taken along a plane that includes a tire rotation axis (not illustrated). Additionally, tire equatorial plane CL is defined as a plane perpendicular to the tire rotation axis through a midpoint of measurement points in a tire cross-sectional width specified by the Japan Automobile Tyre Manufacturers Association Inc. (JATMA). Additionally, tire width direction is defined as the direction parallel with the tire rotation axis, and tire radial direction is defined as the direction perpendicular to the tire rotation axis. Additionally, point A is a tire maximum width position.

A pneumatic tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 are each made by winding annularly multiple times one or more bead wires made of steel, and the pair of bead cores 11, 11 are embedded in bead portions and constitute cores of the bead portions of left and right. The pair of bead fillers 12, 12 are disposed in outer circumferences in the tire radial direction of the pair of bead cores 11, 11, respectively, and reinforce the bead portions.

The carcass layer 13 includes a single layer structure made of one carcass ply or a multilayer structure made by layering a plurality of carcass plies, and the carcass layer 13 extends in a toroidal shape between the bead cores 11, 11 of left and right, and constitutes the backbone of the tire. Additionally, both end portions of the carcass layer 13 are wound and turned back to an outer side in the tire width direction and are fixed to wrap the bead cores 11 and the bead fillers 12. Additionally, the carcass ply of the carcass layer 13 is constituted by covering a plurality of carcass cords made of steel or an organic fiber material (for example, aramid, nylon, polyester, rayon, or the like) with coating rubber and by performing a rolling process on the carcass cords, and the carcass ply of the carcass layer 13 has a cord angle (defined as an inclination angle in a longitudinal direction of the carcass cords with respect to a tire circumferential direction) of 80 degrees or more and 100 degrees or less.

For example, in the configuration of FIG. 1, the carcass layer 13 includes a multilayer structure made by layering two carcass plies 131, 132. However, no such limitation is intended, and the carcass layer 13 may be constituted by layering three or more carcass plies or may include a single layer structure made of one carcass ply (not illustrated).

Figure 2:
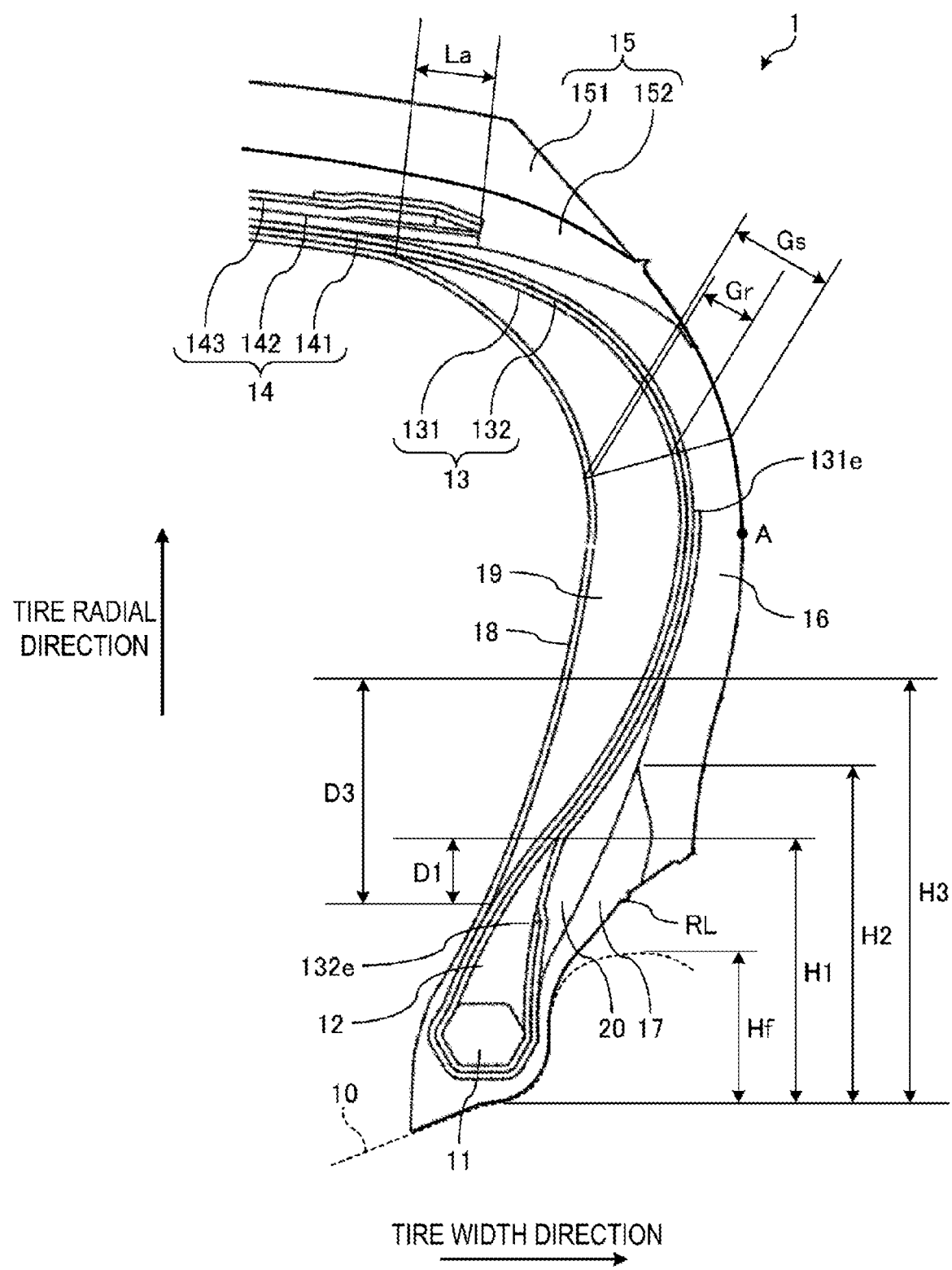
FIG. 2 is an enlarged view illustrating a half region of the pneumatic tire illustrated in FIG. 1.

Additionally, in the configuration of FIG. 1, as illustrated in FIG. 2 described below, a turned back end portion 131e of the carcass ply 131 on an inner diameter side extends further to an outer side than the tire maximum width position A in the tire radial direction, and additionally, a turned back end portion 132e of the carcass ply 132 on an outer diameter side is located between an outer circumferential surface of the bead core 11 and an outer end portion in a radial direction of the bead filler 12. However, no such limitation is intended, and for example, the turned back end portion 131e of the carcass ply 131 on the inner diameter side may extend to a position where the turned back end portion 131e overlaps the belt layer 14 (so-called high turn up structure, not illustrated) or may be located further on an inner side than the tire maximum width position A in the tire radial direction.

The belt layer 14 is made by layering a plurality of belt plies 141 to 143 and is disposed being wound around an outer circumference of the carcass layer 13. The belt plies 141 to 143 include a pair of cross belts 141 and 142 and a belt cover 143.

The pair of cross belts 141, 142 are constituted by covering a plurality of belt cords made of steel or an organic fiber material with coating rubber and by performing a rolling process on the belt cords, and the pair of cross belts 141, 142 each have a cord angle of 15 degrees or more and 55 degrees or less as an absolute value. Additionally, the pair of cross belts 141, 142 have cord angles (defined as inclination angles in a longitudinal direction of the belt cords with respect to the tire circumferential direction) having mutually opposite signs, and the pair of cross belts 141, 142 are layered by mutual intersection of the longitudinal directions of the belt cords (so-called crossply structure). Additionally, the pair of cross belts 141, 142 are disposed being layered on an outer side in the tire radial direction of the carcass layer 13.

The belt cover 143 is constituted by coating a belt cover cord made of steel or an organic fiber material with coating rubber, and the belt cover 143 has a cord angle of 0 degrees or more and 10 degrees or less as an absolute value. Additionally, the belt cover 143 is, for example, a strip material made by coating one or more belt cover cords with coating rubber, and the belt cover 143 is constituted by winding the strip material onto outer circumferential surfaces of the cross belts 141 and 142 multiple times and spirally in the tire circumferential direction. Additionally, the belt cover 143 is disposed covering all the cross belts 141, 142.

The tread rubber 15 is disposed in outer circumferences in the tire radial direction of the carcass layer 13 and the belt layer 14, and constitutes a tread portion of the tire. Additionally, the tread rubber 15 includes a cap tread 151 and an undertread 152 (see FIG. 2 described below). The cap tread 151 is made of a rubber material that is excellent in ground contact characteristics and weather resistance, and the cap tread 151 is exposed in a tread surface all across a tire ground contact surface, and constitutes an outer surface of the tread portion. The undertread 152 is made of a rubber material that is more excellent in heat resistance than the cap tread 151, and the undertread 152 is disposed being sandwiched between the cap tread 151 and the belt layer 14, and constitutes a base portion of the tread rubber 15.

Additionally, the rubber hardness of the cap tread 151 is in the range of 50 or more and 58 or less, and the rubber hardness of the undertread 152 is in the range of 62 or more and 68 or less. Additionally, the cross-sectional area of the undertread 152 in a cross-sectional view in the tire meridian direction is preferably in the range of 40% or more and 60% or less with respect to the sum of the cross-sectional area of the cap tread 151 and the undertread 152. Thus, in the pneumatic tire 1, the cap tread 151 and the undertread 152 have characteristics for a studless tire.

Rubber hardness Hs is measured in accordance with JIS (Japanese Industrial Standard) K6253.

The pair of sidewall rubbers 16, 16 are each disposed on an outer side in the tire width direction of the carcass layer 13, and constitute sidewall portions of left and right, respectively. For example, in the configuration of FIG. 1, an end portion on the outer side in the tire radial direction of the sidewall rubber 16 is disposed in a lower layer of the tread rubber 15 and is sandwiched between the belt layer 14 and the carcass layer 13 (see FIG. 2 described below). However, no such limitation is intended, and the end portion on the outer side in the tire radial direction of the sidewall rubber 16 may be disposed in an outer layer of the tread rubber 15 and exposed in a buttress portion (not illustrated).

The pair of rim cushion rubbers 17, 17 extend from inner sides in the tire radial direction to outer sides in the tire width direction of the bead cores 11, 11 of left and right and turned back portions of the carcass layer 13, and constitute rim fitting surfaces of the bead portions. For example, in the configuration of FIG. 1, an end portion on the outer side in the tire radial direction of the rear cushion rubber 17 is inserted to a lower layer of the side wall rubber 16, and is disposed being sandwiched between the side wall rubber 16 and the carcass layer 13.

The innerliner 18 is an air penetration preventing layer disposed in a tire inner circumferential surface and covering the carcass layer 13, and the innerliner 18 suppresses oxidation due to exposure of the carcass layer 13 and additionally prevents leakage of air inside the tire. Additionally, the innerliner 18 includes, for example, a rubber composition containing butyl rubber as a main component, a thermoplastic resin, a thermoplastic elastomer composition containing an elastomer component blended with a thermoplastic resin, and the like.

Run-Flat Reinforcing Layer

Figure 3:
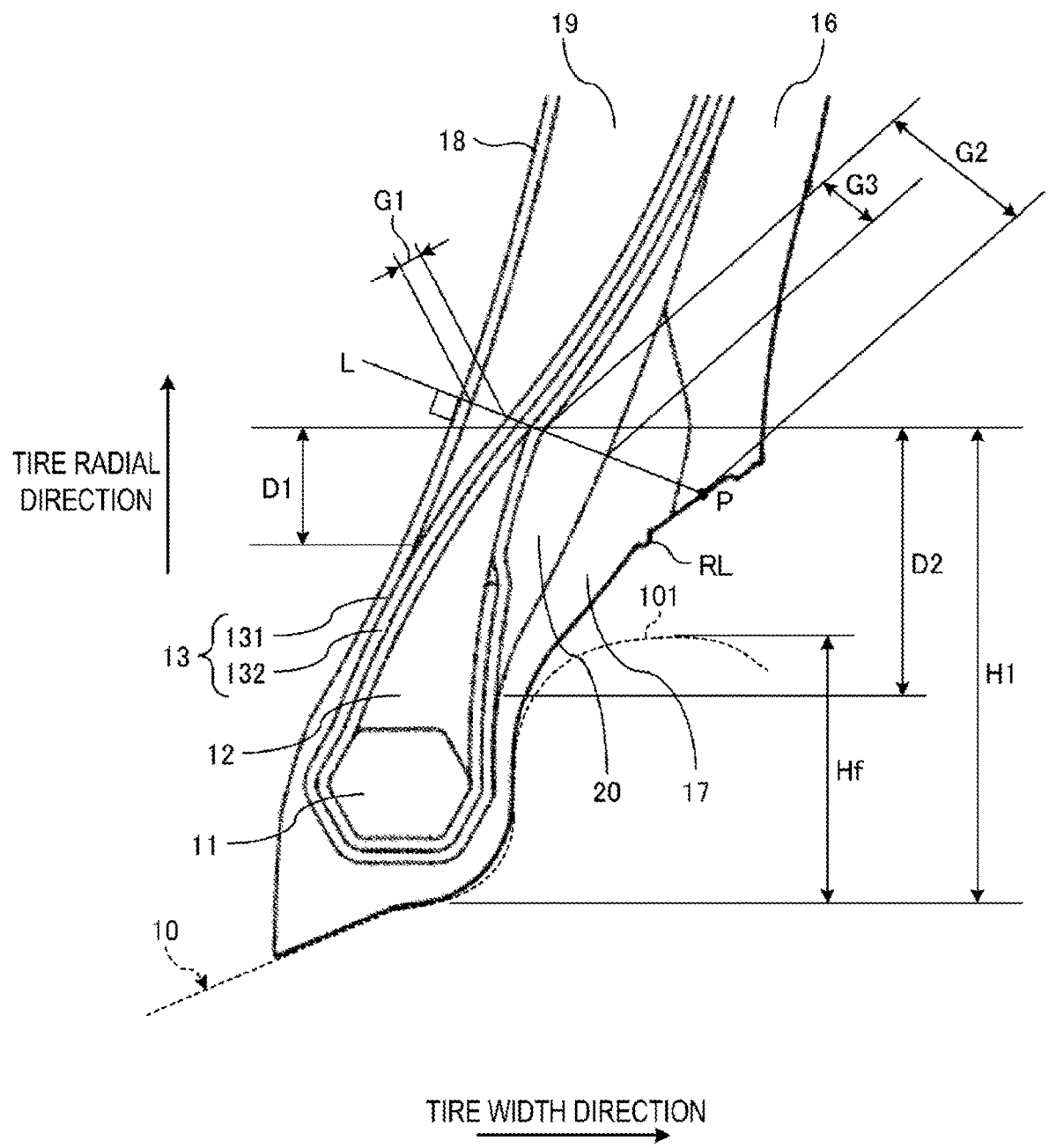
FIG. 3 is an enlarged view illustrating a bead portion of the pneumatic tire illustrated in FIG. 2.

FIG. 2 is an enlarged view illustrating a half region of the pneumatic tire illustrated in FIG. 1. FIG. 3 is an enlarged view illustrating the bead portion of the pneumatic tire illustrated in FIG. 2.

As illustrated in FIG. 1, the pneumatic tire 1 includes a run-flat reinforcing layer 19. The run-flat reinforcing layer 19 is a rubber layer disposed on an inner side in a width direction of the carcass layer 13 and reinforcing a tire side portion. In such a configuration, in a state of a reduced tire internal pressure, the run-flat reinforcing layer 19 holds a tire shape, and accordingly, run-flat running is realized. For example, in the configuration of FIG. 1, the run-flat reinforcing layer 19 has a crescent cross-section and extends along an inner circumferential surface of the carcass layer 13 from the bead portion to the tread portion.

Additionally, the rubber hardness of the run-flat reinforcing layer 19 is in the range of 72 or more and 82 or less, and the run-flat reinforcing layer 19 is harder than the sidewall rubber 16. Additionally, a loss tangent tan δ of the run-flat reinforcing layer 19 is in the range of 0.01 or more and 0.08 or less.

The loss tangent tan δ is measured by using a viscoelasticity spectrometer available from Toyo Seiki Seisaku-sho Ltd. at a temperature of 60° C., a shear strain of 10%, an amplitude of ±0.5%, and a frequency of 20 Hz.

Additionally, as illustrated in FIG. 2, an inner end portion in the radial direction of the run-flat reinforcing layer 19 is disposed overlapping in the tire radial direction the bead filler 12. Additionally, an overlap D1 in the tire radial direction of the run-flat reinforcing layer 19 and the bead filler 12 is preferably 3.0 mm or more. Additionally, an upper limit of the overlap D1 preferably has the relationship D1/SH≤0.25 with respect to a tire cross-sectional height SH (see FIG. 1). Additionally, a height H1 of the bead filler 12 has the relationship 0.15≤H1/SH≤0.40 with respect to the tire cross-sectional height SH (see FIG. 1).

The overlap D1 is measured as the distance in the tire radial direction when the tire is mounted on a specified rim, inflated to a specified internal pressure, and in an unloaded state.

Height H1 of bead filler 12 is the distance in the tire radial direction from a measurement point of a rim diameter to the outer end portion in the radial direction of the bead filler, and is measured when the tire is mounted on a specified rim, inflated to a specified internal pressure, and in an unloaded state.

Tire cross-sectional height SH is the distance having half of a difference between a tire outer diameter and a rim diameter, and is measured when the tire is mounted on a specified rim, inflated to a specified internal pressure, and in an unloaded state.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, a maximum value in "TIRE LOAD LIMITS AT VARIOUS COLD INFLATION PRESSURES" defined by TRA, or "LOAD CAPACITY" defined by ETRTO. However, in JATMA, in the case of a tire for a passenger vehicle, specified internal pressure is an air pressure of 180 kPa, and specified load is 88% of the maximum load capacity at the specified internal pressure.

Additionally, an outer end portion in the radial direction of the run-flat reinforcing layer 19 is disposed overlapping in the tire width direction the cross belt 141 that is wider. Additionally, an overlap La of the run-flat reinforcing layer 19 and the cross belt 141 preferably has the relationship 0.05≤La/Wb1≤0.10 with respect to a belt width Wb1 (see FIG. 1) of the cross belt 141. Accordingly, run-flat durability performance improves, and additionally, tire ground contact characteristics during run-flat running improve.

Additionally, a maximum rubber gauge Gr of the run-flat reinforcing layer 19 has the relationship 0.35≤Gr/Gs≤0.62 with respect to a total gauge Gs (dimension symbol omitted in drawings) of the tire side portion at an identical position. Additionally, in the configuration of FIG. 2, a position of the maximum rubber gauge Gr of the run-flat reinforcing layer 19 is located further on the outer side than the tire maximum width position in the tire radial direction. Additionally, the maximum rubber gauge Gr of the run-flat reinforcing layer 19 is preferably in the range 6.0 mm≤Gr≤11.0 mm.

The total gauge Gs of the tire side portion is measured as the distance from a tire outer surface to a tire inner surface.

Additionally, in FIG. 3, a point P on a tire outer circumferential surface is defined, and the point P is located at a position corresponding to 150% of a rim flange height Hf from a measurement point of a rim diameter of a specified rim 10. The point P is considered as a representative point of a region where damage to the bead portion is easily generated due to external force from a rim flange portion 101, among regions that come into contact with the rim flange portion 101 of the specified rim 10 when the bead portion deforms during run-flat running. Additionally, the point P is generally located further on the outer side than a rim check line RL in the tire radial direction. Additionally, for example, in a case where the rim flange height Hf is 17.5 mm, the point P is located approximately 26.0 mm away from the measurement point of the rim diameter. Additionally, a perpendicular line L is defined, and the perpendicular line L is drawn from the point P to the tire inner circumferential surface.

The rim flange height Hf is calculated as a difference between an outer diameter of the rim flange portion of the specified rim 10 and the rim diameter.

"Rim check line" refers to a line used to check whether the tire is correctly mounted on a rim, and is indicated by, for example, an annular projection portion formed on an outer surface of the bead portion.

At this time, a rubber gauge G1 of the run-flat reinforcing layer 19 on the perpendicular line L, and a rubber gauge G2 of a region from the turned back portion portion of the carcass layer 13 to the tire outer surface preferably have the relationship 0<G1/G2≤0.65, and more preferably have the relationship 0.20≤G1/G2≤0.30. Additionally, the rubber gauge G1 of the run-flat reinforcing layer 19 is preferably in the range 4.0 mm≤G1≤8.0 mm. Thus, the run-flat reinforcing layer 19 intersects the perpendicular line L. Additionally, the rubber gauge G2 of the region described above is preferably in the range 6.0 mm≤G2≤12.0 mm.

In the configuration describe above where both the run-flat reinforcing layer 19 and a second filler 20 are provided, as compared to a configuration (not illustrated) where only the run-flat reinforcing layer is provided, the rigidity of the tire side portion increases, and the tire ground contact area during run-flat running decreases. Specifically, buckling is generated, and the ground contact area of a tread portion center region tends to decrease.

In this regard, in the configuration described above, the rubber gauge G1 of the run-flat reinforcing layer 19 in the region described above where damage to the bead portion is easily generated during run-flat running is set to be small, and thus, the rigidity of the tire side portion in the region described above is reduced. Accordingly, the tire ground contact area during run-flat running is ensured, and the performance on ice of the tire is ensured.

Additionally, the rubber gauge G2 of the region described above on the perpendicular line L preferably has the relationship 0.95≤G2/Gr≤1.15, and more preferably has the relationship 1.00≤G2/Gr≤1.10, with respect to the maximum rubber gauge Gr of the run-flat reinforcing layer 19. Accordingly, the rubber gauge G2 of the region from the turned back portion of the carcass layer 13 to the outer side in the tire width direction is appropriately ensured.

Additionally, as illustrated in FIG. 3, the outer end portion in the radial direction of the bead filler 12 is preferably located further on the inner side than the perpendicular line L in the tire radial direction. In other words, the rubber gauge of the bead filler 12 on the perpendicular line L is preferably 0. In such a configuration, as compared to a configuration (not illustrated) where a higher bead filler is provided, the rigidity of the tire side portion is reduced. Accordingly, the tire ground contact area during run-flat running increases, and the performance on ice of the tire during run-flat running is ensured.

Second Filler

As illustrated in FIGS. 1 and 2, the pneumatic tire 1 includes the second filler 20. The second filler 20 is a rubber member that reinforces the bead portion, and is disposed being sandwiched between the turned back portion of the carcass layer 13 and the rim cushion rubber 17.

Additionally, the rubber hardness of the second filler 20 is in the range of 67 or more and 77 or less, and the second filler 20 is harder than the sidewall rubber 16. Additionally, a loss tangent tan δ of the second filler 20 is in the range of 0.01 or more and 0.08 or less.

Additionally, in FIG. 2, a height H3 of the second filler 20 preferably has the relationship $0.45 \leq H3/SH \leq 0.60$, and more preferably has the relationship $0.50 \leq H3/SH \leq 0.55$, with respect to the tire cross-sectional height SH (see FIG. 1). Additionally, in the configuration of FIG. 2, the height H3 of the second filler 20 is located further on the inner side than the tire maximum width position A in the tire radial direction.

Height H3 of second filler 20 is the distance in the tire radial direction from the measurement point of the rim radial direction to an outer end portion in the radial direction of the second filler 20, and is measured when the tire is mounted on a specified rim, inflated to a specified internal pressure, and in an unloaded state.

Additionally, as illustrated in FIG. 2, the second filler 20 extends further to the outer side than the rim cushion rubber 17 in the tire radial direction. Additionally, a difference between the height H3 of the second filler 20 and a height H2 of the rim cushion rubber 17 is preferably in the range $0.15 \leq (H3-H2)/SH \leq 0.30$ with respect to the tire cross-sectional height SH (see FIG. 1). Additionally, the height H2 of the rim cushion rubber 17 is in the range $0.20 \leq H2/SH \leq 0.25$ with respect to the tire cross-sectional height SH. Accordingly, the reinforcement balance from the bead portion to the tire side portion is properly set.

Additionally, in FIG. 3, the second filler 20 is disposed overlapping in the tire radial direction the bead filler 12. Additionally, an overlap D2 in the tire radial direction of the second filler 20 and the bead filler 12 preferably has the relationship $D2/SH \leq 0.35$ with respect to the tire cross-sectional height SH (see FIG. 1). Accordingly, a decrease in the tire ground contact area during run-flat running due to excessive rigidity of the tire side portion is suppressed. Additionally, a lower limit of the overlap D2 is preferably 10 mm or more. Accordingly, the reinforcement of the tire side portion by the second filler 20 is ensured.

Additionally, in FIG. 2, the second filler 20 is disposed overlapping in the tire radial direction the run-flat reinforcing layer 19. Additionally, an overlap D3 in the tire radial direction of the second filler 20 and the run-flat reinforcing layer 19 preferably has the relationship $0.30 \leq D3/SH \leq 0.40$ with respect to the tire cross-sectional height SH (see FIG. 1). Additionally, as illustrated in FIG. 3, an inner end portion in the radial direction of the second filler 20 is preferably located further on the outer side than an outer end portion in the radial direction of the bead core 11 in the tire radial direction. Accordingly, the reinforcement balance inside and outside the tire side portion is properly set.

Additionally, as illustrated in FIG. 3, the second filler 20 is disposed overlapping in the tire radial direction the rim flange portion 101 of the specified rim 10. Specifically, the inner end portion in the radial direction of the second filler 20 is located further on the inner side than a measurement point on an outer side in the radial direction of the rim flange height Hf in the tire radial direction. Accordingly, during run-flat running, the second filler 20 appropriately extends to a contact region of the bead portion and the rim flange portion 101, and the strength of the bead portion is appropriately ensured.

Additionally, as illustrated in FIG. 3, the inner end portion in the radial direction of the second filler 20 is located further on the inner side than the inner end portion in the radial direction of the run-flat reinforcing layer 19 in the tire radial direction. In other words, the overlap D2 in the tire radial direction of the second filler 20 and the bead filler 12 is greater than the overlap D1 in the tire radial direction of the run-flat reinforcing layer 19 and the bead filler 12 (D1<D2). Additionally, a difference between the overlap D1 and the overlap D2 is preferably in the range 10 mm≤D2−D1. Accordingly, the rigidity of the tire side portion is reduced, and the tire ground contact area during run-flat running increases. Additionally, in FIG. 3, a rubber gauge G3 of the second filler 20 on the perpendicular line L preferably has the relationship $0.50 \leq G3/G2 \leq 0.80$, and more preferably has the relationship $0.50 \leq G3/G2 \leq 0.60$, with respect to the rubber gauge G2 of the region described above. Additionally, the rubber gauge G3 of the second filler 20 is preferably in the range 5.0 mm≤G3≤9.0 mm. Note that in the configuration of FIG. 3, the second filler 20 has a maximum rubber gauge on the perpendicular line L, and accordingly, the run-flat durability performance of the tire is enhanced.

Additionally, in FIG. 3, the rubber gauge G3 of the second filler 20 on the perpendicular line L preferably has the relationship $0.50 \leq G3/Gr \leq 0.80$, and more preferably has the relationship $0.60 \leq G3/Gr \leq 0.70$, with respect to the maximum rubber gauge Gr (see FIG. 2) of the run-flat reinforcing layer 19. Additionally, the rubber gauge G3 of the second filler 20 on the perpendicular line L preferably has the relationship $1.10 \leq G3/G1$ with respect to the rubber gauge G1 of the run-flat reinforcing layer 19. Thus, the rubber gauge G3 of the second filler 20 located on the outer side in the tire width direction is set to be relatively large.

Effect

As described above, the pneumatic tire 1 includes the bead core 11, the bead filler 12 disposed on the outer side in the radial direction of the bead core 11, the carcass layer 13 wrapping the bead core 11 and the bead filler 12 and being wound and turned back, the sidewall rubber 16 constituting the sidewall portion, the rim cushion rubber 17 constituting the rim fitting surface of the bead portion, the run-flat reinforcing layer 19 disposed on the inner side in the width direction of the carcass layer 13, and the second filler 20 disposed between the turned back portion of the carcass layer 13 and the rim cushion rubber 17 (see FIG. 1). Additionally, the point P on the tire outer circumferential surface is defined, the point P is located at a position corresponding to 150% of the rim flange height from the measurement point of the rim diameter of the specified rim, the perpendicular line L is defined, and the perpendicular line L is drawn from the point P to the tire inner circumferential surface (see FIG. 3). At this time, the rubber gauge G1 of the run-flat reinforcing layer 19 on the perpendicular line L, and the rubber gauge G2 of the region from the turned back portion of the carcass layer 13 to the tire outer surface have the relationship $0 < G1/G2 \leq 0.65$.

In the configuration described above where both the run-flat reinforcing layer 19 and the second filler 20 are provided, as compared to a configuration (not illustrated) where only the run-flat reinforcing layer is provided, the rigidity of the tire side portion increases, and the tire ground contact area during run-flat running decreases. Specifically, buckling is generated, and the ground contact area of the tread portion center region tends to decrease.

In this regard, in the configuration described above, the rubber gauge G1 of the run-flat reinforcing layer 19 in the region described above where damage to the bead portion is easily generated during run-flat running is set to be small, and thus, the rigidity of the tire side portion in the region described above is reduced. Accordingly, this is advantageous in that the tire ground contact area during run-flat running is ensured, and the performance on ice of the tire is ensured.

Additionally, in the pneumatic tire 1, the rubber gauge G2 of the region described above on the perpendicular line L has the relationship $0.95 \leq G2/Gr \leq 1.15$ with respect to the maximum rubber gauge Gr of the run-flat reinforcing layer 19 (see FIG. 2). Accordingly, this is advantageous in that the rubber gauge G2 in the region from the turned back portion of the carcass layer 13 to the outer side in the tire width direction is appropriately ensured, and the run-flat durability performance of the tire is ensured.

Additionally, in the pneumatic tire 1, the outer end portion in the radial direction of the bead filler 12 is located further on the inner side than the perpendicular line L in the radial direction (see FIG. 3). In such a configuration, as compared to a configuration (not illustrated) where a higher bead filler is provided, the rigidity of the tire side portion is reduced. Accordingly, this is advantageous in that the tire ground contact area during run-flat running increases, and the performance on ice of the tire is ensured.

Additionally, in the pneumatic tire 1, the inner end portion in the radial direction of the second filler 20 is located further on the inner side than the inner end portion in the radial direction of the run-flat reinforcing layer 19 in the tire radial direction (see FIG. 3). Accordingly, this is advantageous in that the rigidity of the tire side portion is reduced, and the tire ground contact area during run-flat running increases.

Additionally, in the pneumatic tire 1, the rubber gauge G3 of the second filler 20 on the perpendicular line L has the relationship $0.50 \leq G3/G2 \leq 0.80$ with respect to the rubber gauge G2 of the region described above (see FIG. 3). According to the lower limit described above, the reinforcement of the bead portion by the second filler 20 is ensured, and the run-flat performance of the tire is ensured. According to the upper limit described above, a decrease in the tire ground contact area during run-flat running due to excessive rigidity of the tire side portion is suppressed, and performance on ice of the tire is ensured.

Additionally, in the pneumatic tire 1, the rubber gauge G3 (see FIG. 3) of the second filler 20 on the perpendicular line L has the relationship $0.50 \leq G3/Gr \leq 0.80$ with respect to the maximum rubber gauge Gr (see FIG. 2) of the run-flat reinforcing layer 19. According to the lower limit described above, the reinforcement of the bead portion by the second filler 20 is ensured, and the run-flat performance of the tire is ensured. This is advantageous in that according to the upper limit described above, a decrease in the tire ground contact area during run-flat running due to excessive rigidity of the tire side portion is suppressed, and the performance on ice of the tire is ensured.

Additionally, in the pneumatic tire 1, the rubber gauge G3 of the second filler 20 on the perpendicular line L has the relationship $1.10 \leq G3/G1$ with respect to the rubber gauge G1 of the run-flat reinforcing layer 19 (see FIG. 3). Accordingly, this is advantageous in that the reinforcement balance inside and outside the tire side portion is properly set.

Additionally, in the pneumatic tire 1, the inner end portion in the radial direction of the second filler 20 is located further on the inner side than the measurement point on the outer side in the radial direction of the rim flange height Hf in the tire radial direction (see FIG. 3). In such a configuration, during run-flat running, the second filler 20 appropriately extends to the contact region of the bead portion and the rim flange portion 101. Accordingly, this is advantageous in that the strength of the bead portion is appropriately ensured, and the run-flat durability performance of the tire is ensured.

Additionally, in the pneumatic tire 1, the height H3 (see FIG. 2) of the second filler 20 has the relationship $0.45 \leq H3/SH \leq 0.60$ with respect to the tire cross-sectional height SH (see FIG. 1). Accordingly, this is advantageous in that the height H3 of the second filler 20 is properly set.

Additionally, in the pneumatic tire 1, the outer end portion in the radial direction of the second filler 20 is located further on the inner side than the tire maximum width position A in the tire radial direction (see FIG. 2). Accordingly, this is advantageous in that a decrease in the tire ground contact area during run-flat running due to excessive rigidity of the tire side portion is suppressed, and the performance on ice of the tire is ensured.

Additionally, in the pneumatic tire 1, the overlap D2 (see FIG. 2) in the tire radial direction of the second filler 20 and the bead filler 12 has the relationship $D2/SH \leq 0.35$ with respect to the tire cross-sectional height SH (see FIG. 1). Accordingly, this is advantageous in that a decrease in the tire ground contact area during run-flat running due to excessive rigidity of the tire side portion is suppressed.

Additionally, in the pneumatic tire 1, the overlap D2 in the tire radial direction of the second filler 20 and the bead filler 12 has the relationship $D1 < D2$ with respect to the overlap D1 in the tire radial direction of the run-flat reinforcing layer 19 and the bead filler 12 (see FIG. 3). Accordingly, this is advantageous in that a decrease in the tire ground contact area during run-flat running due to excessive rigidity of the tire side portion is suppressed.

Additionally, in the pneumatic tire 1, a difference between the height H3 of the second filler 20 and the height H2 of the rim cushion rubber 17 is in the range $0.15 \leq (H3-H2)/SH \leq 0.30$ (see FIG. 2) with respect to the tire cross-sectional height SH (see FIG. 1). Accordingly, this is advantageous in that the reinforcement balance from the bead portion to the tire side portion is properly set.

Additionally, in the pneumatic tire 1, the overlap D3 (see FIG. 2) in the tire radial direction of the second filler 20 and the run-flat reinforcing layer 19 has the relationship $0.30 \leq D3/SH \leq 0.40$ with respect to the tire cross-sectional height SH (see FIG. 1). Accordingly, this is advantageous in that the reinforcement balance inside and outside the tire side portion is properly set.

Additionally, in the pneumatic tire 1, the rubber hardness of the second filler 20 is in the range of 67 or more and 77 or less. Accordingly, this is advantageous in that the rubber hardness of the second filler 20 is properly set.

EXAMPLES

FIG. 4 is a table showing the results of performance tests of pneumatic tires according to embodiments of the technology.

In the performance tests, (1) run-flat durability performance and (2) braking performance on ice during run-flat running were evaluated for a plurality of types of test tires. Additionally, each of the test tires having a tire size of 245/50RF19 105Q is mounted on a rim having a rim size of 19×7.5 JJ, and a specified load of JATMA is applied to each of the test tires. Additionally, each of the test tires is mounted on a test vehicle that is a Front engine Rear drive (FR) sedan having engine displacement of 4.6 L. Additionally, an internal pressure of the test tire mounted on a right rear wheel of the test vehicle is set to 0 kPa, and an internal pressure of each of the test tires mounted on other wheels is set to a specified internal pressure of JATMA.

(1) In the evaluation relating to run-flat durability performance, the test vehicle runs at 80 km/h on an evaluation course of dry road surfaces, and the distance until the test vehicle becomes unable to run is measured. Then, the measurement results are expressed as index values and evaluated, with the case of completion of running a predetermined distance being assigned as the reference (100). In the evaluation, larger values are preferable.

(2) In the evaluation relating to braking performance on ice during run-flat running, the test vehicle runs on predetermined icy road surfaces, and the braking distance from a running speed of 40 km/h is measured. Then, the measurement results are expressed as index values and evaluated, with Conventional Example being assigned as the reference (100). In the evaluation, larger values are preferable.

Each of the test tires of Examples includes the configurations of FIGS. 1 and 2, and the rubber gauge G1 of the run-flat reinforcing layer 19 on the perpendicular line L illustrated in FIG. 3, and the rubber gauge G2 of the region from the turned back portion of the carcass layer 13 to the tire outer surface have the relationship $0<G1/G2\leq0.65$. Additionally, the tire cross-sectional height SH is 119 mm, the maximum rubber gauge Gr of the run-flat reinforcing layer 19 is 11.0 mm, and the rubber gauge G2 of the region described above on the perpendicular line L is 11.0 mm.

The test tire of Conventional Example is the test tire of Example 1 in which the ratio G1/G2 is set to be large.

As can be seen from the test results, the test tires of Examples can provide improved performance on ice of the tire during run-flat running while ensuring the run-flat durability performance of the tire.

The invention claimed is:

1. A pneumatic tire, comprising in cross-section on each side of a tire equatorial plane: a bead core; a bead filler disposed on an outer side in a tire radial direction of the bead core; a carcass layer wrapping the bead core and the bead filler and being wound and turned back to an outer side in a tire width direction; a sidewall rubber constituting a sidewall portion; a rim cushion rubber constituting a rim fitting surface of a bead portion; a run-flat reinforcing layer disposed on an inner side in the tire width direction of the carcass layer; and a second filler disposed between the turned back portion of the carcass layer and the rim cushion rubber;

a point P on a tire outer circumferential surface being defined, the point P being located at a position equal to 150% of a rim flange height in the tire radial direction from a measurement point of a rim diameter of a specified rim, a perpendicular line L being defined, the perpendicular line L being drawn from the point P to a tire inner circumferential surface so as to be perpendicular to the tire inner circumferential surface, and a rubber gauge G1 of the run-flat reinforcing layer on the perpendicular line L, and a rubber gauge G2 on the perpendicular line L of a region from an outermost surface in the tire width direction of the turned back portion of the carcass layer to the point P having a relationship $0<G1/G2\leq0.65$, wherein in cross-section on each side of the tire equatorial plane the rubber gauge G2 of the region on the perpendicular line L has a relationship $0.95\leq G2/Gr\leq1.15$ with respect to a maximum rubber gauge Gr of the run-flat reinforcing layer perpendicular to the tire inner circumferential surface.

2. The pneumatic tire according to claim 1, wherein an outermost end portion in the the radial direction of the respective bead filler is located further on an inner side than the respective perpendicular line L in the tire radial direction.

3. The pneumatic tire according to claim 1, wherein an innermost end portion in the tire radial direction of the respective second filler is located further on the innermost side than an inner end portion in the tire radial direction of the respective run-flat reinforcing layer.

4. The pneumatic tire according to claim 1, wherein in cross-section on each side of the tire equatorial plane a rubber gauge G3 of the second filler on the perpendicular line L has a relationship $0.50\leq G3/G2\leq0.80$ with respect to the rubber gauge G2 of the region.

5. The pneumatic tire according to claim 1, wherein in cross-section on each side of the tire equatorial plane a rubber gauge G3 of the second filler on the perpendicular line L has a relationship $0.50\leq G3/Gr\leq0.80$ with respect to a maximum rubber gauge Gr of the run-flat reinforcing layer perpendicular to the tire inner circumferential surface.

6. The pneumatic tire according to claim 1, wherein in cross-section on each side of the tire equatorial plane a rubber gauge G3 of the second filler on the perpendicular line L has a relationship $1.10\leq G3/G1$ with respect to the rubber gauge G1 of the run-flat reinforcing layer.

7. The pneumatic tire according to claim 1, wherein an innermost end portion in the tire radial direction of the respective second filler is located further on the inner side than a respective measurement point on an outer side in the tire radial direction of the rim flange height Hf of the specified rim.

8. The pneumatic tire according to claim 1, wherein in cross-section on each side of the tire equatorial plane a height H3 in the tire radial direction of the second filler has a relationship $0.45\leq H3/SH\leq0.60$ with respect to a tire cross-sectional height SH.

9. The pneumatic tire according to claim 8, wherein in cross-section on each side of the tire equatorial plane an outermost end portion in the tire radial direction of the second filler is located further on the inner side in the tire radial direction than a tire maximum width position A.

10. The pneumatic tire according to claim 1, wherein in cross-section on each side of the tire equatorial plane an overlap D2 in the tire radial direction of the second filler and the bead filler has a relationship $D2/SH\leq0.35$ with respect to a tire cross-sectional height SH.

11. The pneumatic tire according to claim 1, wherein in cross-section on each side of the tire equatorial plane an overlap D2 in the tire radial direction of the second filler and the bead filler has a relationship $D1<D2$ with respect to an overlap D1 in the tire radial direction of the run-flat reinforcing layer and the bead filler.

12. The pneumatic tire according to claim 1, wherein in cross-section on each side of the tire equatorial plane a difference between a height H3 in the tire radial direction of the second filler and a height H2 in the tire radial direction of the rim cushion rubber is in a range $0.15\leq(H3-H2)/SH\leq0.30$ with respect to a tire cross-sectional height SH.

13. The pneumatic tire according to claim 1, wherein in cross-section on each side of the tire equatorial plane an overlap D3 in the tire radial direction of the second filler and the run-flat reinforcing layer has a relationship $0.30 \leq D3/SH \leq 0.40$ with respect to a tire cross-sectional height SH.

14. The pneumatic tire according to claim 1, wherein a JIS rubber hardness of the respective second filler is in a range of 67 or more and 77 or less.

* * * * *